(12) United States Patent
Gaffe et al.

(10) Patent No.: US 12,535,302 B2
(45) Date of Patent: Jan. 27, 2026

(54) INTELLIGENTLY-AUTOMATED DEFENSIVE THREAT COORDINATOR

(71) Applicants: John C. Gaffe, Fredericksburg, VA (US); Larry A. Thomas, Pflugerville, TX (US); Robert L. Goan, Driftwood, TX (US)

(72) Inventors: John C. Gaffe, Fredericksburg, VA (US); Larry A. Thomas, Pflugerville, TX (US); Robert L. Goan, Driftwood, TX (US)

(73) Assignee: United States of America, Dept. of the Navy, Washington, DC (US)

( * ) Notice: Subject to any disclaimer, the term of this patent is extended or adjusted under 35 U.S.C. 154(b) by 51 days.

(21) Appl. No.: 18/649,036

(22) Filed: Apr. 29, 2024

(65) Prior Publication Data

US 2025/0334381 A1    Oct. 30, 2025

Related U.S. Application Data

(60) Provisional application No. 63/544,987, filed on Oct. 20, 2023.

(51) Int. Cl.
*F41H 11/02* (2006.01)
*G08G 3/02* (2006.01)

(52) U.S. Cl.
CPC ............... *F41H 11/02* (2013.01); *G08G 3/02* (2013.01)

(58) Field of Classification Search
CPC .................................. F41H 11/02; G08B 3/02
USPC ........................................................... 89/1.11
See application file for complete search history.

(56) References Cited

U.S. PATENT DOCUMENTS

| | | | |
|---|---|---|---|
| 10,907,940 B1 * | 2/2021 | Parker | G06N 3/08 |
| 11,953,294 B1 * | 4/2024 | Barfoot | F41H 13/0056 |
| 2017/0192089 A1 * | 7/2017 | Parker | G08G 5/727 |
| 2020/0043346 A1 * | 2/2020 | Vacek | G08G 5/22 |
| 2020/0108925 A1 * | 4/2020 | Smith | B64U 70/30 |
| 2020/0363824 A1 * | 11/2020 | Levin | H04W 4/021 |
| 2022/0034633 A1 * | 2/2022 | Yeshurun | G05D 1/101 |
| 2023/0211861 A1 * | 7/2023 | Gamache | F41H 11/02 114/240 R |
| 2023/0400282 A1 * | 12/2023 | Kepler | G01S 7/415 |

FOREIGN PATENT DOCUMENTS

| | | | | |
|---|---|---|---|---|
| WO | WO-2017200460 A1 * | 11/2017 | | F41A 27/08 |
| WO | WO-2020236238 A1 * | 11/2020 | | G05D 1/689 |
| WO | WO-2024121314 A1 * | 6/2024 | | F41H 11/02 |

* cited by examiner

*Primary Examiner* — Samir Abdosh
(74) *Attorney, Agent, or Firm* — NSWC DAHLGREN

(57) ABSTRACT

A method for reducing a detect-to-respond timeline. The method includes evaluating a threat status of at least one object, prioritizing, based on the threat status, each object, optimizing at least one potential response to each object, recommending at least one optimized response, and executing a response selected from the optimized responses.

20 Claims, 4 Drawing Sheets

INTELLIGENTLY-AUTOMATED DEFENSIVE THREAT COORDINATOR

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to defensive countermeasures. In particular, a method to reduce the detection-to-respond timeline.

Currently the surface force has no intelligently automated response capability for single or collective multi-ship torpedo defense. The Navy has significantly improved Torpedo, Detection, Classification and Localization (TDCL); however, there is no tangible post detection capability to improve survival probability. Some of the recent improvements in detection provide more data for determining an optimized defensive response. With limited countermeasure inventories, an optimized torpedo defense capability could also help reduce unnecessary countermeasure expenditures.

Today, when a ship detects a weapon, such as a torpedo, a non-holistic process is employed to conduct non-kinetic evasion responses: the ship maneuvers using a manual, fixed "steering template" or verbal orders to determine next course (rudder). Sailors use stopwatches to determine when to instruct a crewmember throw a countermeasure over the side of the ship. A Towed Countermeasure may or may not be energized and/or in the correct mode/filter combination. Fleet exercise reconstruction suggests that ships do not always execute evasive maneuvers correctly. If a ship does not execute a maneuver correctly, then it is safe to assume that the associated countermeasure placement was not optimal either. Additionally, more than one maneuver may be available, but in the heat of battle, a ship might select and execute the wrong maneuver.

Furthermore, in operational scenarios that include multiple ships operating in close proximity, there is no intelligent solution to conduct and execute an optimized force wide evasion response. In some cases it might not be optimal for all ships to maneuver, or, one or more ships should maneuver as part of a "selective attrition" approach to protect a less capable high-value unit; however, today's doctrine requires all ships in the force to evade independently, which disrupts ongoing operations (e.g. aircraft carrier flight operations).

SUMMARY

The disclosed methods and systems below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Sidestep proposes a unique, novel approach to solve these problems by providing an automated solution that incorporates current Doctrine, customizable Pre-Planned Responses (PPRs) and Threat Weapon Characteristics in one system, which exchanges data with the host ship sensors and available countermeasures (kinetic and non-kinetic) The system will provide recommendations for whether or not the ship should maneuver. If the recommendation is to evade, the SideStep will algorithm will select and parse all platform capabilities to provide all necessary rudder and throttle orders necessary for the execution of the evasion. SideStep will derive these orders from Doctrine, Tactics or PPR data loaded into a relational database. Additionally, SideStep offers automated optimized decoy launching and placement to remove human error from the detect-to-evade loop. In the event a dedicated countermeasure decoy launcher is not available, SideStep will provide alerts for the exact times to disperse the decoys manually. Lastly, SideStep will recommend appropriate Towed Countermeasure (TCM) settings for use against specific threat torpedoes.

Finally, SideStep provides a novel ability to import, modify and export Pre-Planned Responses and Tactics. Doctrine provided by the Navy Warfare Commands will be electronically loaded into the system and available for use. As new tactics or doctrine is developed to pace evolving adversary threats, it can be quickly added to the SideStep library and be made available for the Warfighter to use.

In one embodiment, the present application discloses a method for reducing a detect-to-respond timeline. The method includes evaluating a threat status of at least one object, prioritizing, based on the threat status, each object, optimizing at least one potential response to each object, recommending at least one optimized response, and executing a response selected from the optimized responses. In a further embodiment, the method includes monitoring, by at least one sensor, the at least one object, receiving, from each object, at least one signal, analyzing the at least one signal, and evaluating the threat status to at least one high value vehicle is based on the analysis of the at least one signal. In a further embodiment, the method includes analyzing the at least one signal results in at least one of a spatial location, a direction of travel, a rate of travel, and/or the type of prime mover. In a further embodiment, the method includes generating an alert, when the object is not inbound, dismissing the alert, when the object is not a probabilistic threat, dismissing the alert, when the object is inbound and a probabilistic threat to a high-value vehicle, generating and communicating the alert to the high value vehicle, determining, by accessing a relational database, a type of threat posed by the object, and when the object is a probabilistic threat the potential responses to each object are optimized based on the type of threat posed by the object. In a further embodiment, the method includes determining a time to impact, determining, based on a type of threat posed by the object, a lethality of the at least one object, and wherein the potential responses are optimized based on the time to impact and lethality of the at least one object. In a further embodiment, the method includes recommending the optimized responses in order of decreasing probability of survivability. In a further embodiment, the method includes a response that is automatically selected from the optimized responses without the intervention of a human. In a further embodiment, the method includes recording object data in a database for machine learning. In a further embodiment, the method wherein the threat status is evaluated based on at least one of the object bearing and object range. In a further embodiment, the method includes a non-centralized, distributed computer system architecture for implementing the method.

In another embodiment, the present application discloses a system for reducing a detect-to-respond timeline. The system includes at least one sensor to monitor at least one object, and a non-centralized, distributed computer system architecture implementing a method for reducing a detect-to-respond timeline. The method includes evaluating a threat status of at least one object, prioritizing, based on the threat status, each object, optimizing potential responses to each object, recommending the optimized responses, and executing a response selected from the optimized responses, at least one vehicle and at least one weapon or decoy system to execute the selected response. In a further embodiment, the present application discloses wherein the at least one sensor is a plurality of sensors distributed among a plurality of vehicles and the non-centralized, distributed computer system architecture is redundantly distributed among the plurality of vehicles such that if one of the vehicles or sensors is rendered inoperable the system remains operable.

In another embodiment, the present application discloses a system for reducing a detect-to-respond timeline. The system includes at least one sensor to monitor at least one object, at least one vehicle, at least one weapon system, and a computer system that receives at least one signal from the at least one sensor, analyzing the at least one signal, evaluating a threat status based on the analyzed signal and a lethality of each object, prioritizing each object based on the threat status and lethality, and recommending, based on the threat status and lethality, at least one response to maximize survivability. In a further embodiment, the present application discloses wherein the lethality of each object further includes accessing a relational database mapping previously analyzed signals characterizing a known object, and comparing the at least one signal from each monitored object, and identifying the known object which best resembles the monitored object. In a further embodiment, the present application discloses generating a representative lethality of an analysis object using a machine learning model trained by a training dataset comprising a lethality of at least one known object, and automatedly identifying the lethality of the monitored object based on the representative lethality. In a further embodiment, the present application discloses determining a lethality score based on the known object identified, and wherein recommending the at least one response to maximize survivability is based on the determined lethality score. In a further embodiment, the present application discloses wherein the lethality score is one of low, medium, or high. In a further embodiment, the present application discloses recording the at least one signal characterizing the monitored object in the relational database for future analysis. In a further embodiment, the present application discloses determining a value of a plurality of vehicles, ranking the vehicles by the determined value, and attriting the vehicles based on the vehicle rank.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1A:
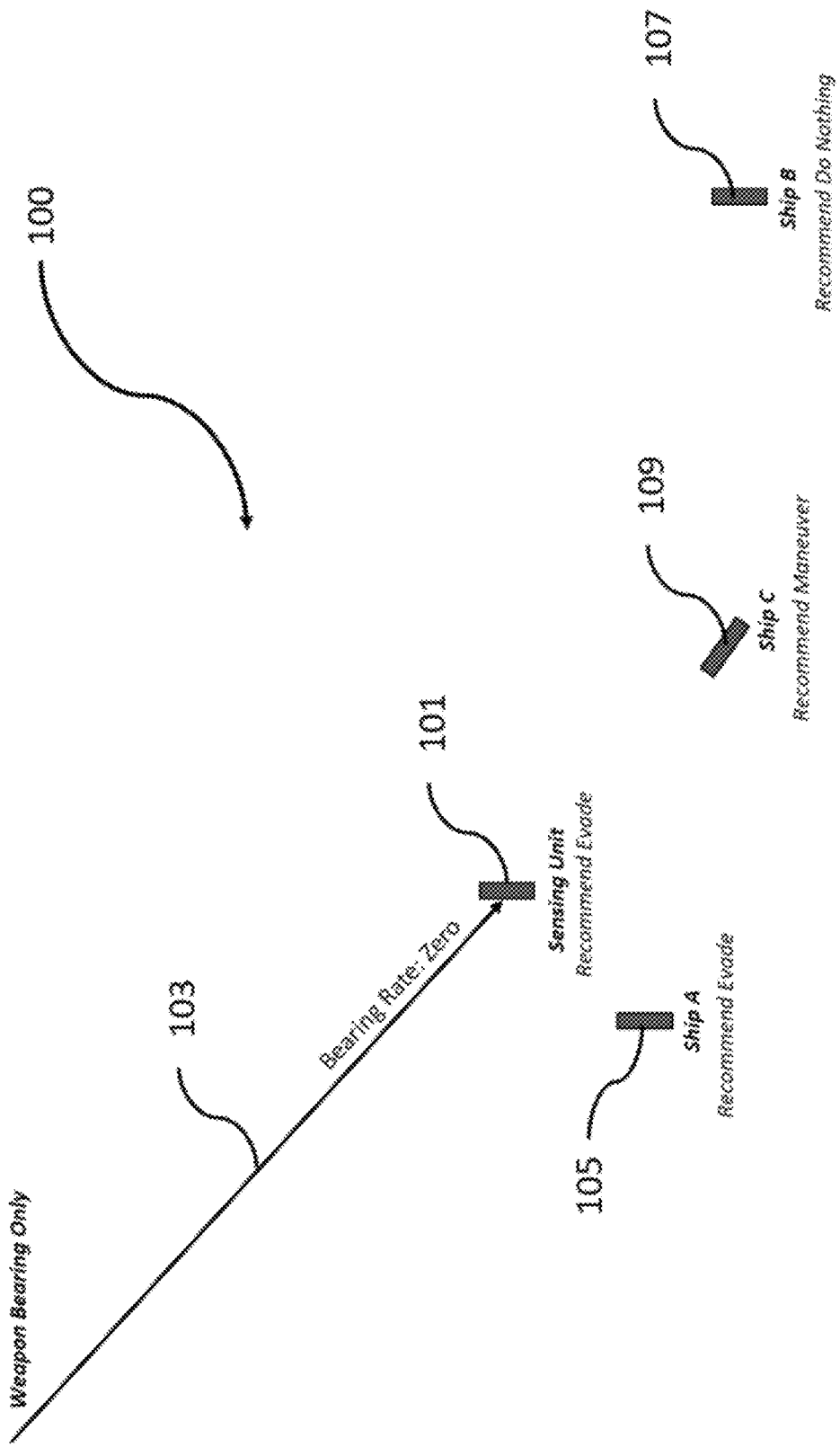
FIG. 1A shows the spatial relationship between SideStep instances with weapon bearing only detection.

FIG. 1A shows the spatial relationship 100 between SideStep instances with weapon bearing only detection. In this scenario, a sensing unit 101 detects and classifies a threat weapon (not shown). The sensing unit 101 sends the threat weapon information to the force via voice reports and link track. The sensing unit 101 has bearing only data 103 for the threat weapon at time of detection. Turning to ship A 105, SideStep has determined that evasion and countermeasures are appropriate using bearing rate estimate for threat and distance to Sensing Unit 101. SideStep would provide best evasion maneuver and Acoustic Deployable Countermeasure (ADC) employment recommendations. Turning to ship B 107, SideStep does not recommend evasion and countermeasures based on the maximum weapon run time. This recommendation is based on range between Ship A 105 and Ship B 107. If bearing rate increases to the right then a new recommendation may be calculated. Turning to Ship C 109, SideStep would recommend a course change to open range from Sensing Unit 101. SideStep would recommend maximum available speed without evasive maneuvers, based on the separation between Ship C 109 and the Sensing Unit 101. In the event that an updated solution for the threat weapon is determined, each SideStep would recalculate the response as necessary. In some scenarios, additional SideStep-derived recommendations could include "selective attrition" where a consort ship maneuvers to distract or decoy a threat weapon to protect a more vulnerable high-value unit.

Figure 1B:
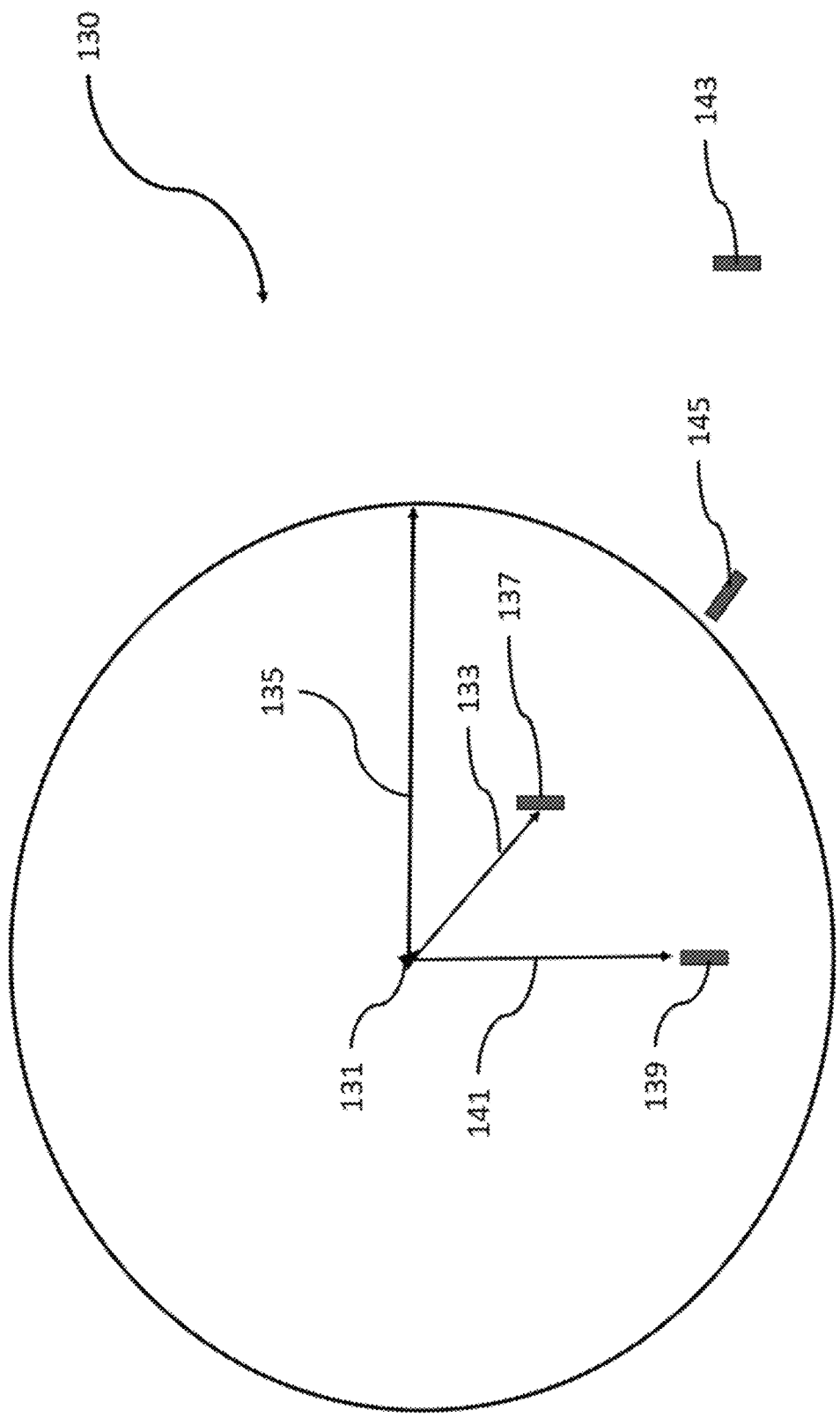
FIG. 1B shows the spatial relationship between SideStep instances with a threat weapon bearing and range detection.

FIG. 1B shows the spatial relationship 130 between SideStep instances with a threat weapon 131 bearing 133 and range 135 detection. In this scenario, the sensing unit 137 has detected and classified the threat weapon 131. The threat weapon 137 detection information is sent to the force via voice reports and link track. The sensing unit 137, which may be a ship or any vehicle, determines an estimated range 135 for the weapon 131. Turning to Ship A 139, SideStep has determined that evasion and countermeasures are appropriate using range estimate 141 for threat. SideStep would provide best evasion maneuver and Acoustic Deployable Countermeasure (ADC) employment recommendations. Turning to Ship B 143, SideStep, using maximum weapon runout 135, determines that evasion or countermeasures are not required. Turning to Ship C 145, SideStep would recommend a course change to remain beyond maximum weapon range. SideStep would calculate best speed and course to remain beyond threat weapon range. In the event that an updated solution for the threat weapon is determined, each SideStep would recalculate the response as necessary.

Figure 2:
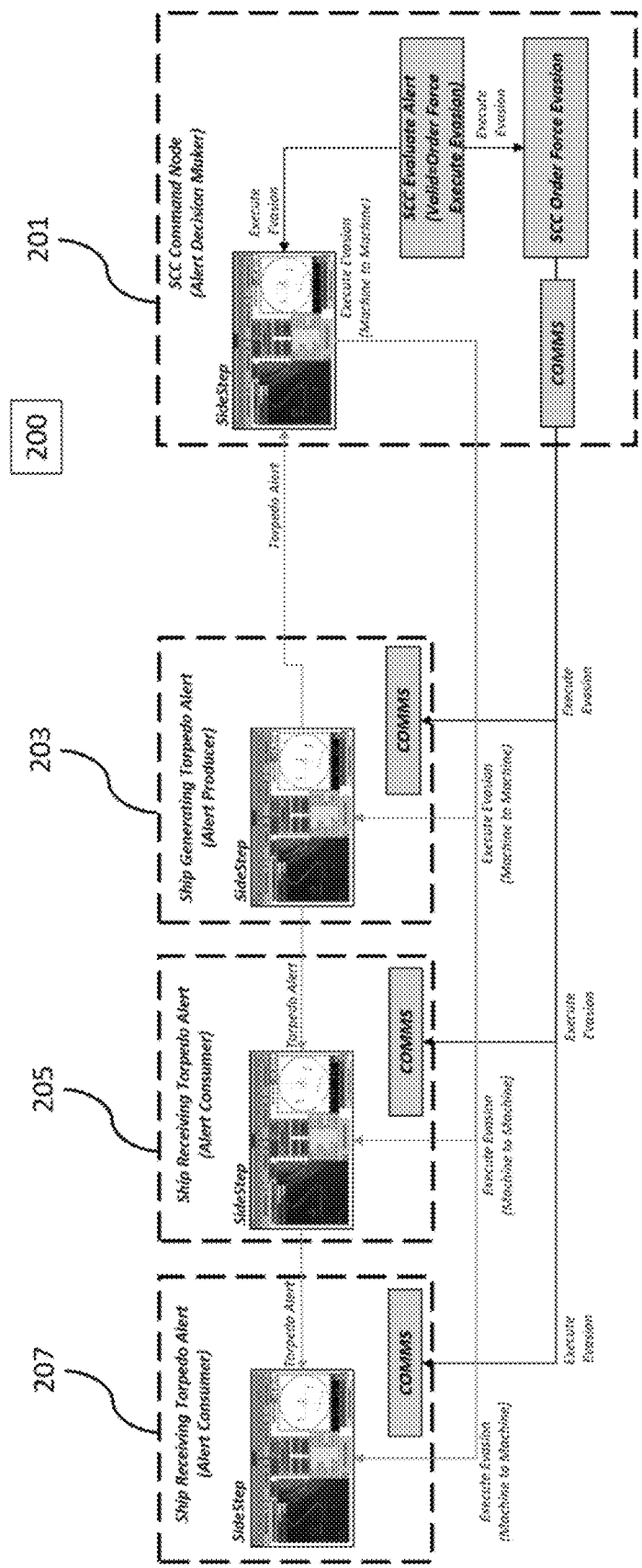
FIG. 2 shows the SideStep Force Integration and Communications network.

FIG. 2 shows the SideStep Force Integration and Communications network 200. In FIG. 2, the disclosure uses a torpedo as an example of the incoming threat. The Sea Combat Commander (SCC) 201 is embarked on a SideStep (Non-Sensing Platform) ship. The Sensing Platform 203 generates the initial alert and sends the alert data to the network composition. For simplicity, a cohort of only four platforms. In this case, the platforms are ships 201, 203, 205, 207. In this case, four platforms are shown; however, the network size is unlimited. Further, while SideStep is shown centralized on ship 201, SideStep may also be decentralized (non-centralized) network. The SCC 201 evaluates the alert and determines validity. If the alert is deemed valid then and evasion order is given via appropriates communications (COMMS) paths and initiates a machine to machine execute evasion order. In a decentralized network, due to short decision timeline constraints each SideStep instance prepares the response (doctrine) when it receives the initial alert. When the SCC 201 deems an alert valid each SideStep 201, 203, 205, 207 executes the appropriate doctrine response. When a platform is steaming alone then it would evaluate and execute the response In Accordance With (IAW) Battle Orders and the appropriate Operational Task (OPTASK) guidance.

Figure 3:
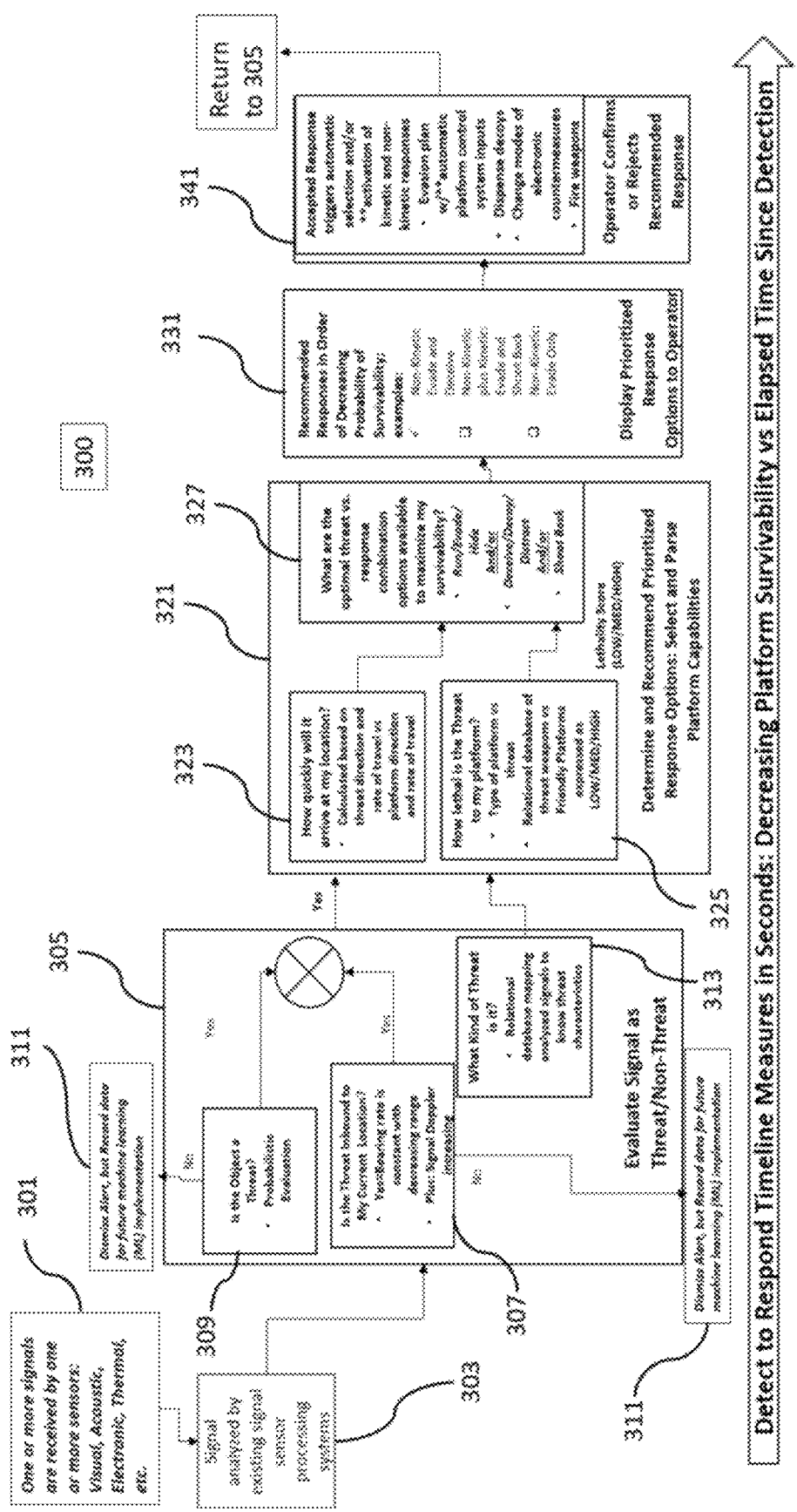
FIG. 3 shows the SideStep method.

FIG. 3 shows the SideStep method 300. In block 301, SideStep receives one or more signals from at least one sensor. The sensors may include but are not limited to visual, acoustic, electronic, and thermal sensor. In block 303, SideStep analyzes the signal. The signal is analyzed for spatial location, direction of travel, rate of travel, and the type of prime-mover characterized (e.g. electric motor, thermal propulsion, rocket/jet engine, etc.). In block 305, SideStep evaluates the signal from block 303 to determine whether the signal is a threat or not a threat. At block 307, the evaluation process of block 305 determines whether the threat is inbound to the current location of a ship such as as any of the ships of FIGS. 1A-B. Block 307 may determine whether the threat is inbound by determining whether the bearing rate is constant with a decreasing range and/or signal Doppler is increasing. In block 309, Side Step determines whether the object is a threat by using a probabilistic evaluation. If SideStep, at either block 307 or 309, determines that the threat is not inbound or a probabilistic threat, SideStep, at block 311 dismisses the alert and the data is recorded for future machine learning (ML) implementation. At block 313, SideStep determines the type of threat using a relational database mapping analyzed signals to understand the threat characteristics. If SideStep, at either block 307 or 309, determines that the threat is inbound and a probabilistic threat, SideStep delivers the information from block 313 to block 321.

In block 321, SideStep determines and recommends prioritized response options by selecting and parsing the platform capabilities. In block 323, SideStep determines how quickly the threat will arrive. SideStep makes this determination based on threat direction and rate of travel vs. the rate of travel of the platform under threat. In block 325, SideStep determines the lethality of the threat to the platform. SideStep makes this determination based on the type of platform and the type of threat using a relational database of threat weapons vs. friendly platforms. SideStep expresses this determination as a low, medium, or high lethality score. Then, SideStep uses the determinations of blocks 323 and 325 in block 327. In block 327, SideStep evaluates the optimal threat vs. response combination options available to maximize survivability. The options include but are not limited to Run/Evade/Hide and/or Deceive/Decoy/Distract and/or shoot back.

In block 331, SideStep displays the prioritized responses determined in block 321 to an operator. SideStep displays the recommended responses in order of decreasing probability of survivability. Examples of the responses may include Non-Kinetic Evade and Deceive; Non-Kinetic plus Kinetic: Evade and Shoot Back; and Non-Kinetic: Evade Only.

In block 341, the operator confirms or rejects the recommended responses. The accepted (or confirmed) response triggers automatic selection and/or activation of kinetic and non-kinetic responses. These responses may include: Evasion plan w/automatic platform control system inputs; Dispense decoys; Change modes of electronic countermeasures; and/or Fire weapons.

If necessary, SideStep then continuously updates threat status and potential responses by returning from block 341 to block 305. SideStep reduces the detect-to-respond timeline and provides a holistic approach to coordinate all available resources for self-defense by intelligently and continuously, automating tasks conducted by the operator. Further, SideStep minimizes expenditure of resources to achieve maximum effect (survivability) particularly against multiple threats by deploying the least costly response to address the threat.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A method for reducing a detect-to-respond timeline, the method comprising:
    evaluating a threat status of at least one object;
    assigning, based on the threat status, a lethality score to each object;
    prioritizing, based on the lethality score, each object;
    optimizing at least one potential response to each object;
    recommending at least one optimized response; and
    executing a response selected from the optimized responses.

2. The method of claim 1, further comprising:
    monitoring, by at least one sensor, the at least one object;
    receiving, from each object, at least one signal;
    analyzing the at least one signal; and
    evaluating the threat status to at least one high value vehicle is based on the analysis of the at least one signal.

3. The method of claim 2, wherein analyzing the at least one signal results in at least one of a spatial location, a direction of travel, a rate of travel, and/or the type of prime mover.

4. The method of claim 1, wherein evaluating the threat status of at least one object further comprises:
    generating an alert;
        when the object is not inbound, dismissing the alert;
        when the object is not a probabilistic threat, dismissing the alert;
        when the object is inbound and a probabilistic threat to a high-value vehicle, generating and communicating the alert to the high value vehicle;
    determining, by accessing a relational database, a type of threat posed by the object; and
    when the object is a probabilistic threat the potential responses to each object are optimized based on the type of threat posed by the object.

5. The method of claim 1, wherein optimizing potential responses to each object further comprises:
   determining a time to impact;
   determining, based on a type of threat posed by the object, a lethality of the at least one object;
   wherein the potential responses are optimized based on the time to impact and lethality of the at least one object.

6. The method of claim 1, wherein recommending the optimized responses further comprises:
   recommending the optimized responses in order of decreasing probability of survivability.

7. The method of claim 1, wherein the response is automatically selected from the optimized responses without the intervention of a human.

8. The method of claim 1, wherein evaluating a threat status of at least one object further comprises:
   recording object data in a database for machine learning.

9. The method of claim 1, wherein the threat status is evaluated based on at least one of the object bearing and object range.

10. The method of claim 1, further comprising:
    a non-centralized, distributed computer system architecture for implementing the method.

11. A system for reducing a detect-to-respond timeline, the system comprising:
    at least one sensor to monitor at least one object;
    a non-centralized, distributed computer system architecture implementing a method for reducing a detect-to-respond timeline comprising;
       evaluating a threat status of at least one object;
       prioritizing, based on the threat status, each object;
       optimizing potential responses to each object;
       recommending the optimized responses; and
       executing a response selected from the optimized responses;
    at least one vehicle and at least one weapon or decoy system to execute the selected response.

12. The system of claim 11, wherein the system wherein the at least one sensor is a plurality of sensors distributed among a plurality of vehicles and the non-centralized, distributed computer system architecture is redundantly distributed among the plurality of vehicles such that if one of the vehicles or sensors is rendered inoperable the system remains operable.

13. A system for reducing a detect-to-respond timeline, the system comprising:
    at least one sensor to monitor at least one object;
    at least one vehicle;
    at least one weapon system; and
    a computer system for receiving:
       at least one signal from the at least one sensor;
       analyzing the at least one signal;
       evaluating a threat status based on the analyzed signal and a lethality of each object;
       prioritizing each object based on the threat status and lethality; and
       recommending, based on the threat status and lethality, at least one response to maximize survivability.

14. The system of claim 13 wherein the lethality of each object further comprises:
    accessing a relational database mapping previously analyzed signals characterizing a known object; and
    comparing the at least one signal from each monitored object; and
    identifying the known object which best resembles the monitored object.

15. The system of claim 13, further comprising:
    generating a representative lethality of an analysis object using a machine learning model trained by a training dataset comprising a lethality of at least one known object; and
    automatedly identifying the lethality of the monitored object based on the representative lethality.

16. The system of claim 15, further comprising:
    determining a lethality score based on the known object identified; and
    wherein recommending the at least one response to maximize survivability is based on the determined lethality score.

17. The system of claim 16, wherein the lethality score is one of low, medium, or high.

18. The system of claim 15, further comprising:
    recording the at least one signal characterizing the monitored object in the relational database for future analysis.

19. The system of claim 13, further comprising:
    ranking a plurality of vehicles by a determined value; and
    attriting the vehicles based on the vehicle rank.

20. The system of claim 13, wherein the weapon system further comprising a decoy system.

* * * * *